United States Patent [19]

Lamb et al.

[11] Patent Number: 4,825,424
[45] Date of Patent: Apr. 25, 1989

[54] SENSING SYSTEMS

[75] Inventors: Chris Lamb, Sherborne; Chris Wade, Southampton, both of Great Britain

[73] Assignee: Plessey Overseas Limited, Ilford, England

[21] Appl. No.: 94,880

[22] PCT Filed: Oct. 21, 1986

[86] PCT No.: PCT/GB86/00646
§ 371 Date: Aug. 20, 1987
§ 102(e) Date: Aug. 20, 1987

[87] PCT Pub. No.: WO87/02453
PCT Pub. Date: Apr. 23, 1987

[30] Foreign Application Priority Data

Oct. 21, 1985 [GB] United Kingdom ............... 8525924
Apr. 3, 1986 [GB] United Kingdom ............... 8608167

[51] Int. Cl.⁴ ............................................. H04R 23/00
[52] U.S. Cl. ................................. 367/141; 367/149; 367/154; 356/352
[58] Field of Search ............... 367/140, 141, 149, 151, 367/153, 154; 356/345, 352

[56] References Cited

U.S. PATENT DOCUMENTS

| 4,115,753 | 9/1978 | Shajenko | 367/129 |
| 4,193,130 | 3/1980 | Young et al. | 367/149 |
| 4,293,188 | 10/1981 | McMahon | 367/140 |
| 4,294,513 | 10/1981 | Nelson et al. | 367/140 |
| 4,297,887 | 11/1981 | Bucaro | 73/655 |
| 4,313,185 | 1/1982 | Choran | 367/140 |
| 4,375,680 | 3/1983 | Cahill et al. | 367/178 |
| 4,486,657 | 12/1984 | Bush | 367/149 |
| 4,525,818 | 6/1985 | Cielo et al. | 367/149 |
| 4,546,458 | 10/1985 | Cielo et al. | 367/149 |
| 4,649,529 | 3/1987 | Avicola | 367/149 |

FOREIGN PATENT DOCUMENTS 0027540 4/1981 European Pat. Off. .

Primary Examiner—Deborah L. Kyle
Assistant Examiner—John W. Eldred
Attorney, Agent, or Firm—Fleit, Jacobson, Cohn & Price

[57] ABSTRACT

A sensing system for sensing acoustic waves, the sensing system comprises one or more sensor elements for use underwater, a reference sensor, and compensation means for compensating noise generated in the sensing system in dependence upon signals provided by the sensor elements and the reference sensor.

11 Claims, 3 Drawing Sheets

SENSING SYSTEMS

This invention relates to sensing systems, and in particular to sensing systems for sensing strain or deformation (e.g. elongation or bending) of various members.

Interference in sensing systems due to spurious noise, particularly noise generated within the sensing system itself, can reduce the sensitivity of the system by masking signals to be sensed by the system. This problem is particularly noticeable in sensing systems for sensing acoustic waves, which sensing systems comprise optical fibres, piezoelectric elements or hydrophones which are for use underwater and/or for being towed behind marine vessels.

A sensing system for sensing acoustic waves is described in our co-pending United Kingdom Patent Application (Publication No. 2126820A). In this sensing system a coherent light pulse or coherent light pulse pairs are launched into an optical fibre which is arranged to be subjected to deforming forces such as acoustic waves. The optical fibre is divided into a plurality of sensor elements so that a small proportion of each coherent light pulse transmitted along the fibre will be reflected back along the fibre at the junction between each of the sensor elements. Reflected light pulses are superimposed in the optical fibre, and after leaving the optical fibre, they are passed to a photo-detection means and detector. In response to receiving the pulses, the photo-detection means produces electrical signals indicative of changes in optical path length of the elements due to the incidence of the deforming forces.

The coherent light pulse or pulse pairs are generated by a laser which introduces spurious phase shifts (microphonic effect) on the pulse or pulse pairs due to noise consequent upon external disturbances on the laser. Further, noise generated elsewhere in the sensing system also introduces spurious phase shifts on the pulse or pulse pairs. The sensitivity of the sensing system described in GB No. 2126820A is limited by the susceptibility of the laser to environmental noise. The noise generated by the laser and the noise generated elsewhere in the sensing system can produce phase/frequency modulation on the electrical signals produced by the photo-detection means which can be larger than phase/frequency modulation produced as a result of deforming forces on the sensor elements, and hence the phase modulation produced due to the deforming forces on the sensor elements can be masked.

It is an aim of the present invention to provide a sensing system in which the spurious noise can be compensated for in order that the sensitivity of the sensing system can be improved.

According to the present invention there is provided a sensing system for sensing acoustic waves comprising one or more sensor elements for use underwater, a reference sensor, and compensation means for compensating for noise generated in the sensing system in dependence upon signals provided by the sensor elements and the reference sensor.

The one or more sensor elements may together form an optical fibre for being subjected along its length to deforming forces such as acoustic waves. The optical fibre may be provided along its length with a number of spaced discontinuities which divide the optical fibre into the plurality of sensor elements.

In one embodiment of the present invention, the reference sensor may be one of the sensing elements, the reference sensor being isolated from the deforming forces.

In an alternative embodiment, the reference sensor may be in the form of an isolated optical fibre element which is located remotely from the optical fibre.

In a third embodiment of the present invention the reference sensor may be one of the sensor elements of the optical fibre, which sensor element is arranged to have a different sensitivity from that of the other sensor elements.

In the case where the sensing elements together form an optical fibre, the sensing system may comprise: generating means for producing coherent light pulses for transmission along the sensor elements of the optical fibre and the reference sensor; and a detector for providing sensor signals, in dependence upon light pulses reflected from the sensor elements, indicative of the deforming forces subjected on the sensor elements, and for providing a reference signal, in dependence upon light pulses reflected from the reference sensor, containing information indicative of noise generated in the sensing system; the compensation means being operative for compensating for the noise in dependence upon the reference signal.

The detector may comprise a photo-detector, and a demultiplexing means for providing a plurality of demultiplexed signals each representing light pulses reflected from different sensor elements, and for providing a demultiplexed reference signal representing light pulses reflected from the reference sensor.

In one form of the detector, a demodulating means may be provided for demodulating the demultiplexed reference signal to provide the reference signal, and for demodulating the demultiplexed electrical signals to provide the sensor signals.

In this arrangement of detector, the compensation means may comprise subtraction means, for example, a plurality of difference amplifiers operative for subtracting the reference signal from the sensor signals thereby to compensate for the noise.

In the embodiment where the reference sensor may be one of the sensor elements of the optical fibre, which sensor element is arranged to have a different sensitivity from an adjacent sensor element, the compensation means may comprise further subtraction means operative for subtracting the reference signal from the sensor signal dependent upon light pulses reflected from the sensor element adjacent to the reference sensor thereby to cancel for the effect of the difference in sensitivity between the reference sensor and the adjacent sensor element.

In an alternative form of detector, the compensation means may comprise a mixing means operative for multiplying each of the sensor signals with the reference signal thereby to compensate for the noise.

In a further embodiment of the present invention, the reference signal may be fed back to the generating means. In this case, the compensation means may be in the form of a piezoelectric device (in a laser of the generating means), the piezoelectric device being responsive to the reference signal thereby to compensate for the noise.

It is envisaged that the sensor elements and the reference sensor of the sensing system may be in the form of piezoelectric elements.

Embodiments of the present invention have the advantage that noise generated within the sensing system can be compensated for. This has the advantage that the sensitivity of sensing systems embodying the present invention can be increased.

The invention will now be further described by way of example, with reference to the accompanying drawings, in which like reference numerals designate like elements, and in which.

A sensing system for sensing strain or deformation (such as strain caused by acoustic waves) of various members is described in our co-pending United Kingdom Patent Application (Publication No. 2126820A), the subject matter of which is to be incorporated herein by reference. The sensing system described therein is an optical sensing system comprising a reflectometric optical fibre for being towed behind a marine vessel.

Figure 1:
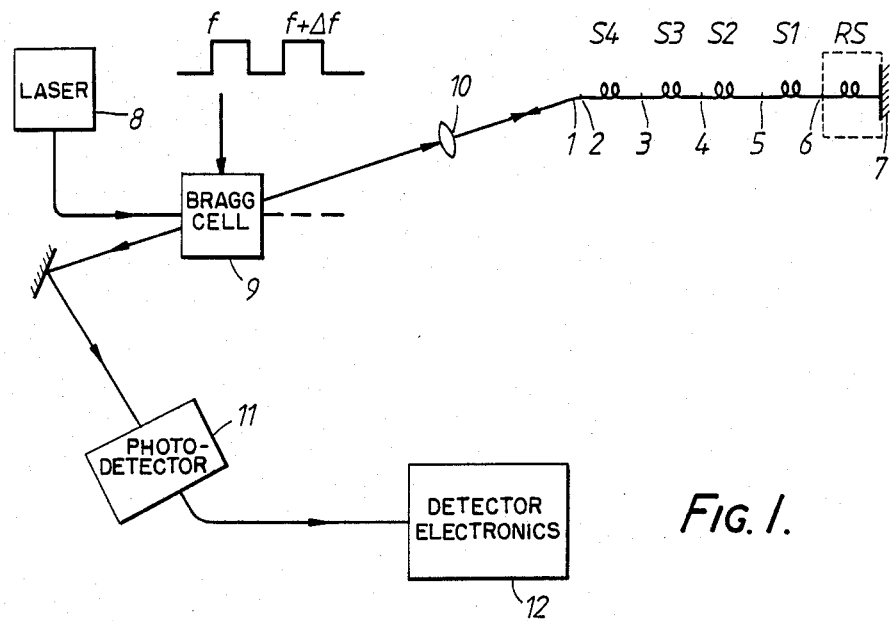
FIG. 1 is a schematic diagram of a sensing system according to the present invention.

In FIG. 1 of the accompanying drawings there is shown a sensing system which operates in a similar manner to that described in our above mentioned co-pending Patent Application. The optical sensing system shown in FIG. 1 comprises an optical fibre 1 which has a plurality of spaced discontinuities 2, 3, 4, 5 and 6 which divide the optical fibre 1 into a plurality of sensor elements S1, S2, S3, S4 and a reference sensor RS. The sensing system also comprises a generating means for generating coherent light pulses. In this case, the generating means comprises a laser 8 and a Bragg cell 9 which are together operative to generate the coherent light pulses which are in the form of two-pulse signals of frequencies f and f+Δf as indicated in the waveform diagram in FIG. 1.

The coherent pulses are launched into the optical fibre 1 via a lens 10. As each two-pulse light signal reaches the first optical fibre discontinuity 2 a small proportion of the signal will be reflected back along the optical fibre 1 to the Bragg cell 9 which directs the reflected signal to a photo-detector 11 of a detector 12. The remaining part of the two-pulse signal travels on to the discontinuity 3 at which a further small proportion thereof will be reflected back along the optical fibre 1 to the photo-detector 11. This procedure continues until that part of the two-pulse signal remaining reaches the last of the optical fibre discontinuities 7 and a small proportion of this signal is again reflected back along the optical fibre to the photo-detector 11. A further two-pulse optical transmission is then made and the cycle repeated.

The reference sensor RS is isolated from the deforming forces so that the sensor RS is acoustically isolated from acoustic waves which may impinge on it. The coherent light pulses which are reflected back along the optical fibre 1 from the reference sensor RS are not subjected to any change arising from the deforming forces since the reference sensor RS is isolated from these forces. Consequently, these pulses only contain changes which are consequent upon noise generated in the sensing system (i.e. including noise from the laser 8, the Bragg cell 9 and mechanically induced optical noise).

The reflected pulses are received at the photo-detector 11 which produces electrical signals in response to the coherent light pulses received from the sensor elements S1, S2, S3, S4. The electrical signals have a phase or frequency modulation which varies in dependence upon changes in lengths and refractive index of the sensor elements S1 to S4 due to the deforming forces impinging thereon, and have a phase or frequency modulation due to the noise in the optical sensing system. The photo-detector 11 also produces a further electrical signal in response to coherent light pulses received from the reference sensor RS. This further signal therefore has phase or frequency modulation which is consequent upon only noise generated in the optical sensing system.

The electrical signals and the further electrical signal are then fed to a detector 12 which is operative to compensate for the noise in dependence upon the further electrical signal. Examples of the detector 12 will be described below with reference to FIGS. 3 and 4.

Figure 2:
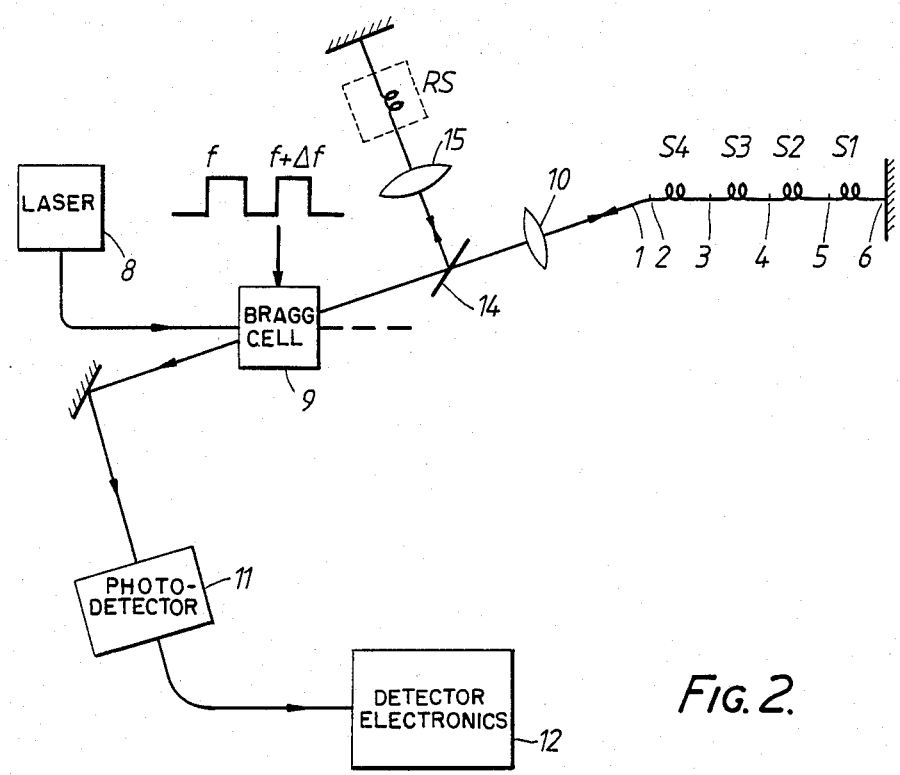
FIG. 2 is a schematic diagram of an alternative sensing system according to the present invention.

FIG. 2 shows an alternative sensing system in which the reference sensor RS is located remotely from the optical fibre 1. Preferably, the reference sensor RS is located close to the generating means. In this embodiment, a proportion of the coherent light pulses can be reflected into the reference sensor RS by means of a half-silvered mirror 14 and via a lens 10.

If there is any significant distance between the reference sensor RS and the sensor elements S1, S2, S3 and S4, a phase difference will be introduced between the electrical signals and the further electrical signal since these signals will arrive at the detector 12 at different times and so complete compensation will not occur. This phase difference can be avoided by introducing optical or electronic delays into the sensing system.

Figure 3:
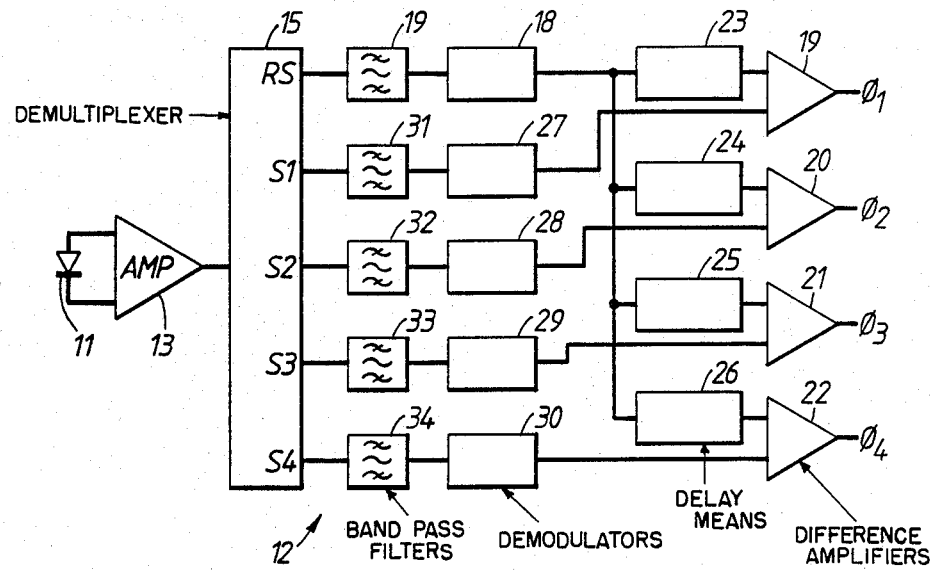
FIG. 3 is a block diagram of a detector which may be used in an embodiment of the present invention.
Figure 4:
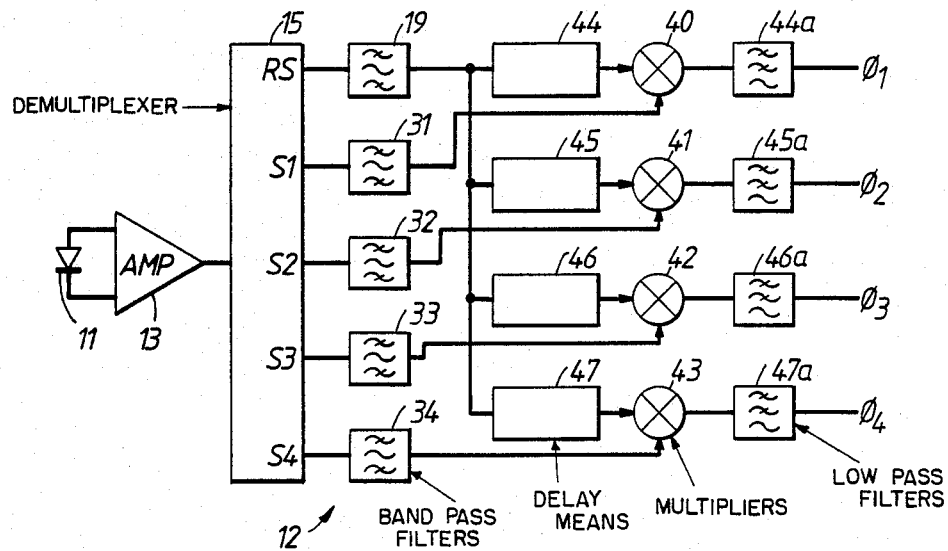
FIG. 4 is a block diagram of an alternative detector which may be used in an embodiment of the present invention.

Referring now to FIGS. 3 and 4, two alternative detectors suitable for use in the sensing systems of FIGS. 1 and 2 will be described.

In FIG. 3 the detector 12 comprises the photo-detector 11 and a demultiplexing means 15 which receives the electrical signals and the further electrical signal from the photo-detector 11 (via an amplifier 13) and demultiplexes them to provide a plurality of demultiplexed signals corresponding to coherent light pulses reflected from each of the sensor elements S1 to S4, and to provide a demultiplexed reference signal corresponding to the coherent light pulses reflected from the reference sensor RS.

The demultiplexed reference signal is fed to a demodulator 18 via a band-pass filter 19. The demodulator is matched in terms of frequency and amplitude response and provides a reference signal which is representative of the noise generated in the optical sensing system. The reference signal is then fed to a compensating means, which in this case, comprises four difference amplifiers 19, 20, 21 and 22, and respective delay means 23, 24 25 and 26. The reference signal is fed to an input of each of the four difference amplifiers 19, 20, 21 and 22 and respective delay means 23, 24, 25 and 26. The reference signal is fed to an input of each of the four difference amplifiers 19, 20, 21 and 22 via a respective delay means 23, 24, 25 and 26.

Each one of the demultiplexed signals is fed to a respective demodulator 27, 28, 29, 30 via a respective band-pass filter 31, 32, 33, 34. Each one of the demodulators 27 to 30 is matched in terms of frequency and amplitude response and each provides a sensor signal indicative of phase shift occurring due to deforming forces impinging on one of the sensor elements plus phase shift due to noise in the sensing system.

Each of the sensor signals is then fed to a second input of respective difference amplifiers 19 to 22 where the reference signal is subtracted from each of the sensor signals to provide outputs $\phi_1$, $\phi_2$, $\phi_3$ and $\phi_4$ respectively which are compensated for in respect of noise generated in the sensing system. The delay means 23 to 26 are provided to allow for the fact that the coherent light pulses from the reference sensor RS are received by the photo-detector 11 at different times from receipt by the photo-detector 11 of the coherent light pulses from the sensor elements S1, S2, S3 and S4. The magnitude of the delays of the respective delay means 23 to 26 would depend on the position of reference sensor RS relative to the sensor elements S1 to S4.

Referring now to FIG. 4, an alternative form of detector is shown. In this detector, the compensation means comprises four multipliers 40, 41, 42 and 43 each of which receives the demultiplexed reference signal via a respective delay means 44 to 47 (to compensate for time lags in the optical system). Each of the multipliers 40 to 43 mixes one of the demultiplexed signals with the demultiplexed reference signal to provide sum and difference frequency outputs. Since the demultiplexed reference signal and the demultiplexed signals have the same carrier frequencies, then the difference outputs from the multipliers 40 to 43 is a signal containing phase information due to deforming forces on the respective sensor elements S1 to S4, the noise having been compensated for. The sum and difference outputs of each of the mixers 40 to 43 are fed through a respective low-pass filter 44a to 47a to provide the required outputs $\phi_1$, $\phi_2$, $\phi_3$ and $\phi_4$.

Figure 5:
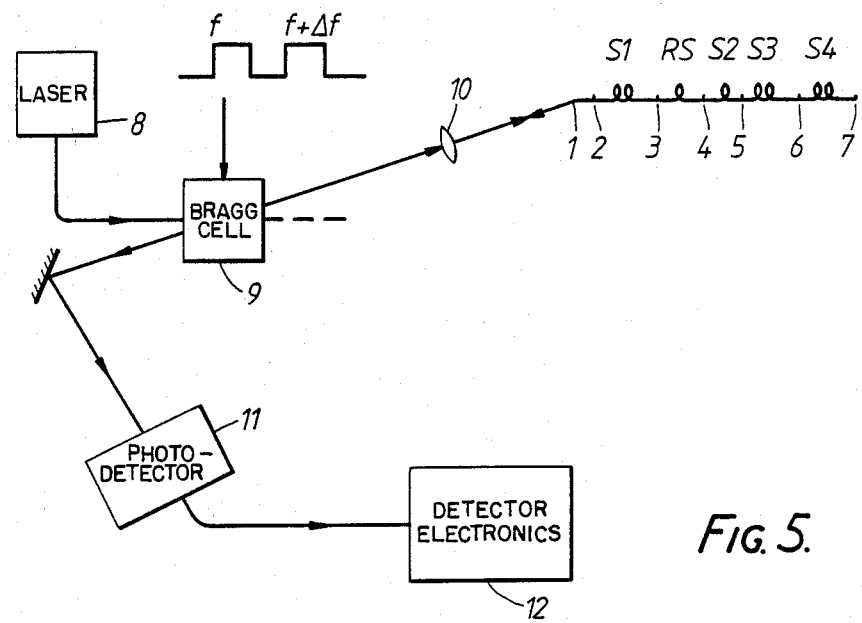
FIG. 5 is a schematic diagram of a further sensing system according to the present invention; and, FIG. 6 is a block diagram of a detector which may be used in the sensing system of FIG. 5.

Referring to FIG. 5, a further sensing system is shown in which the reference sensor RS is positioned between two sensor elements and is of a different sensitivity to that of an adjacent sensor element S1 or S2. The reference sensor RS is enclosed in a different medium to provide the different sensitivity and is not isolated from deforming forces as in the arrangements described with reference to FIGS. 1 and 2.

Figure 6:
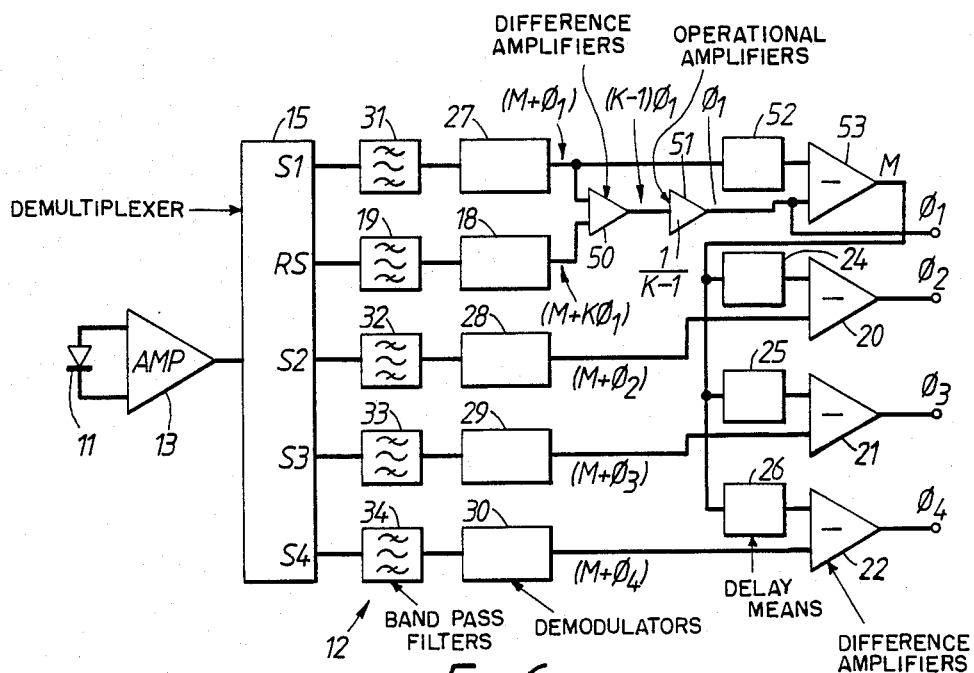

In this embodiment the compensation means of the detector 12 comprises a further subtraction means operative for cancelling the effect of the difference in sensitivity as shown in FIG. 6. The reference signal provided by the demodulator 18 contains information relating to deforming forces impinging on the reference sensor RS which differs by a factor K from that of the adjacent sensor element, such as the sensor element S1 due to the difference in sensitivity between these two elements. In order to cancel the effect of this difference, the reference signal $(M+K\phi_1)$ from the demodulator 18 and the sensor signal $(M+\phi_1)$ from the demodulator 27 are fed to a difference amplifier 50 of the further subtraction means (where M denotes phase information due to the noise generated in the optical sensing system). The difference amplifier 50 provides a difference output $(K-1)\phi_1$ which is fed through an operational amplifier 51 of the further subtraction means. The operational amplifier has a gain of $1/(K-1)$ and therefore provides an output $\phi_1$ which is indicative of deforming forces impinging on the adjacent sensor element S1. The outputs $\phi_2$, $\phi_3$ and $\phi_4$ are derived in a similar manner to that described with reference to FIG. 3 except that the compensation means receives a signal representative of the phase information M due to noise generated in the sensing system from a delay means 52 and a difference amplifier 53 of the further subtraction means.

The difference amplifier 53 receives the output signal $\phi_1$ from the operational amplifier 51 and receives the demodulated signal $(M+\phi_1)$ from the demodulator 27 via the delay means 52 and subtracts them to provide the signal representative of the phase information M due to noise. This signal is teen fed to one input of each of the difference amplifiers 20, 21 and 22, via a respective delay means 24 to 26, where it is subtracted from one of the demodulated outputs $(M+\phi_2)$, $(M+\phi_3)$, $(M+\phi_4)$ to provide the output $\phi_2$, $\phi_3$ and $\phi_4$ respectively.

The embodiments described above are specific examples of how the present invention may be put into effect and modifications may be made to the embodiments without departing from the scope of the present invention. For example, any number of sensor elements may be provided (for example, one or more) and the detector 12 may be arranged accordingly to accommodate any change in the number of sensor elements by providing, in the case where the number of sensor elements is greater than four, further channels in the demultiplexing means 15 and further demodulators. Moreover, the reference sensor RS may be located at any position along the optical fibre 1 and appropriate delays being incorporated into the detector.

In addition, it is envisaged that the compensation means may comprise a piezo-electric device in the laser of the pulse generating means 8, in which the signal representing noise generated by the optical sensing system is fed back in antiphase to the piezo-electric device. For example, this may be achieved by mounting a laser mirror on a piezo-electric mount.

Alternatively, the signal representing noise may be used to drive the Bragg cell 9 from a voltage controlled oscillator, the signal being used to control the frequency of the Bragg cell.

We claim:

1. A sensing system for sensing acoustic waves, the sensing system comprising:

an optical fiber for positioning underwater so as to be exposed to acoustic waves tending to deform the optical fiber, the optical fiber having spaced discontinuities along its length, each pair of adjacent discontinuities with the length of optical fiber therebetween constituting a sensor element;

optical fiber reference means containing light reflecting means;

light generating means for producing coherent light pulses and for transmitting the pulses along the optical fiber and along said optical fiber reference means, the light pulses being reflected from said spaced discontinuities and from said light reflecting means;

detector means for detecting reflected light pulses, the detector means including a demultiplexing means for separating reflected pulses from said optical fiber reference means into a reference channel, and reflected pulses from said sensor elements into further channel means;

the reference channel including signal processing means to derive a noise phase shift signal representative of phase shift arising from noise within the system, the further channel means including signal processing means to derive sensor element phase shift signals representative of phase shift caused by deformation of the individual sensor elements;

and compensation means responsive to said noise phase shift signal for applying a compensation to the sensing system in order to reduce the effect of noise in said sensor element phase shift signals.

2. A sensor system according to claim 1 wherein the reference sensor comprises a sensor element.

3. A sensor system according to claim 2 wherein the reference sensor is arranged to be acoustically isolated from an acoustic wave received by the optical fibre.

4. A sensor system according to claim 2 wherein the reference sensor is arranged to have a sensitivity to a received acoustic wave which differs from the sensitivity of the sensor elements.

5. A sensor system according to claim 1 wherein the reference sensor comprises an optical fibre element distinct from the optical fibre having the spaced discontinuities and comprising the sensor elements.

6. A sensor system according to claim 1 wherein the demultiplexing means provides a plurality of demultiplexed electrical signals each representing light pulses reflected from different sensor elements.

7. A sensor system according to claim 1 wherein the compensation means comprises a plurality of difference amplifiers for subtractively combining the noise phase shift signal from the sensor element phase shift signals thereby to compensate for the noise generated in the sensing system.

8. A sensor system according to claim 1 wherein the compensation means comprises mixing means for multiplying the sensor element phase shift signals with the noise phase shift signal thereby to compensate for the noise generated in the system.

9. A sensor system according to claim 1 wherein the light generating means comprises a laser source and a piezoelectric device and the generating means is arranged to receive the noise phase shift signal, the piezoelectric device being responsive to the noise phase shift signal thereby to compensate for the noise generated in the system.

10. A sensor system according to claim 1 wherein the light generating means comprises a laser source and a Bragg cell arranged to be driven from a voltage controlled oscillator, and the noise phase shift signal is arranged to control the frequency of operation of the Bragg cell thereby to compensate for the noise generated in the system.

11. A sensing system, the sensing system comprising:

an optical fibre for positioning in an environment so as to be exposed to external forces tending to deform the optical fibre, the optical fibre having spaced discontinuities along its length, each pair of adjacent discontinuities with the length of optical fibre therebetween constituting a sensor element;

optical fibre reference means containing light reflecting means;

light generating means for producing coherent light pulses and for transmitting the pulses along the optical fibre and along said optical fibre reference means, the light pulses being reflected from said spaced discontinuities and from said light reflecting means;

detector means for detecting reflected light pulses, the detector means including a demultiplexing means for separating reflected pulses from said optical fibre reference means into a reference channel, and reflected pulses from said sensor elements into respective sensor channels;

the reference channel including signal processing means to derive a noise phase shift signal representative of phase shift arising from noise within the system, each sensor channel including signal processing means to derive a respective sensor element phase shift signal representative of phase shift caused by deformation of respective sensor elements;

and each sensor channel including compensation means responsive to said noise phase shift signal for applying a compensation to the sensor element phase shift signal in order to reduce the effect of noise in said sensor element phase shift signals.

* * * * *